United States Patent
Makarios et al.

(10) Patent No.: US 6,401,125 B1
(45) Date of Patent: Jun. 4, 2002

(54) SYSTEM AND METHOD FOR MAINTAINING STATE INFORMATION BETWEEN A WEB PROXY SERVER AND ITS CLIENTS

(75) Inventors: Selene K. Makarios, Mountain View; Robert C. Fitzwilson, Atherton, both of CA (US)

(73) Assignee: Nextpage, Inc., Lehi, UT (US)

(*) Notice: Subject to any disclaimer, the term of this patent is extended or adjusted under 35 U.S.C. 154(b) by 0 days.

(21) Appl. No.: 09/369,489

(22) Filed: Aug. 5, 1999

(51) Int. Cl.⁷ .............................................. G06F 15/16
(52) U.S. Cl. ..................... 709/229; 709/219; 709/225; 713/200; 713/201
(58) Field of Search ............................... 709/202, 219, 709/205, 229, 225; 710/36; 370/85, 329; 380/25, 49; 713/200, 201

(56) References Cited

U.S. PATENT DOCUMENTS

| | | | |
|---|---|---|---|
| 5,805,803 A | 9/1998 | Birrell et al. | 395/187.01 |
| 5,961,593 A * | 10/1999 | Gabber et al. | 709/219 |
| 6,081,900 A * | 5/2000 | Subramaniam et al. | 713/201 |
| 6,112,228 A | 8/2000 | Earl et al. | 709/205 |
| 6,209,100 B1 * | 3/2001 | Robertson et al. | 713/200 |
| 6,226,752 B1 * | 5/2001 | Gupta et al. | 713/201 |

* cited by examiner

*Primary Examiner*—Glenton B. Burgess
*Assistant Examiner*—Chuong Ho
(74) *Attorney, Agent, or Firm*—Skjerven Morrill MacPherson LLP

(57) ABSTRACT

A distributed network communication system implements a series of token exchange transactions similar to those used when passing browser cookies between an Internet server and a browser client. Rather than instigating a cookie exchange transaction from the Internet server to store information relevant to the server, according to this aspect of the present invention the proxy cookie is stored on the client side at the behest of the web proxy. To the browser client, the proxy cookie appears to be identical to any regular browser cookie; however, whenever the browser client presents a request for information to the proxy which is to be passed on to the Internet server, the proxy strips the proxy cookie from the request and uses it to identify the originator of the request. Based on this, the proxy can customize and personalize the client's information request as appropriate and pass it on to the Internet server.

8 Claims, 3 Drawing Sheets

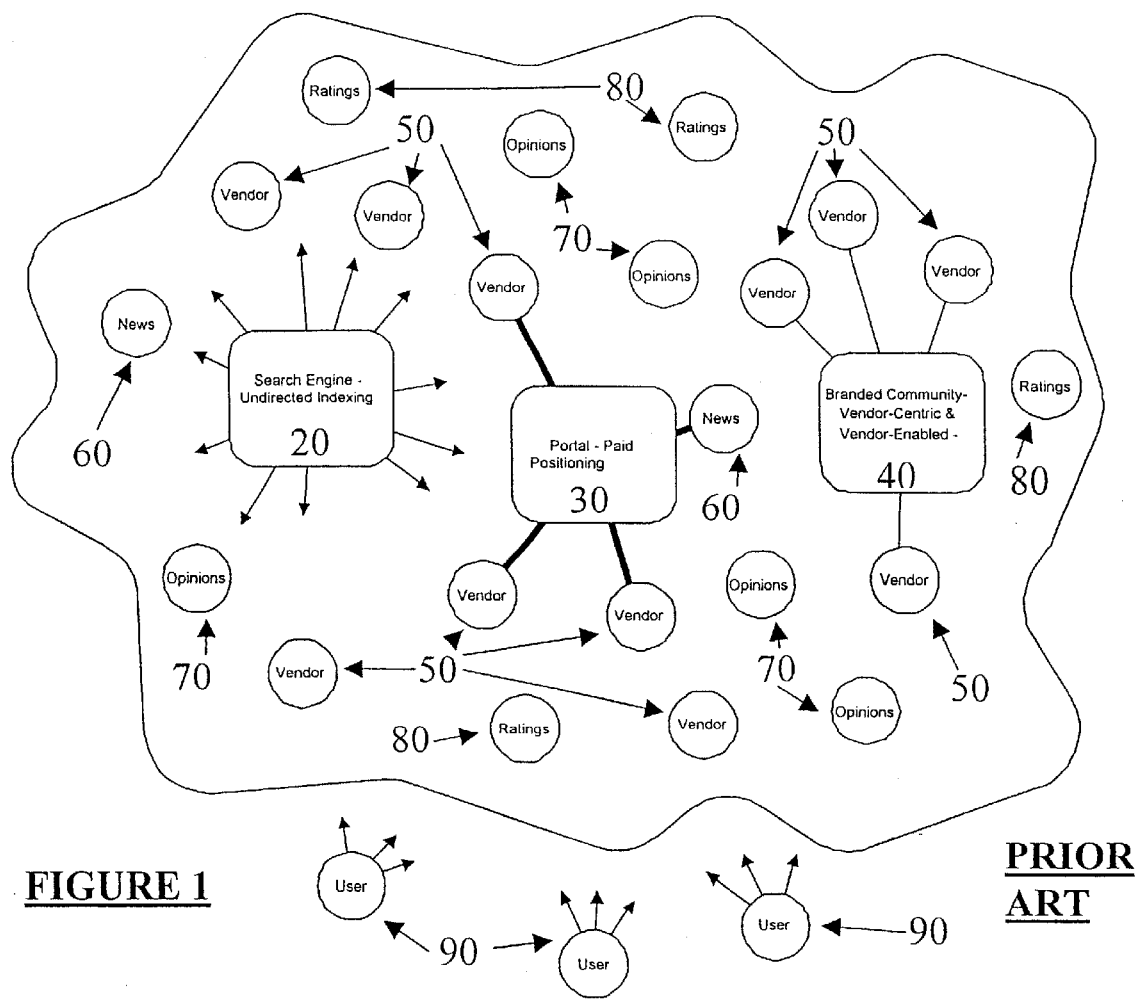
FIGURE 1  PRIOR ART
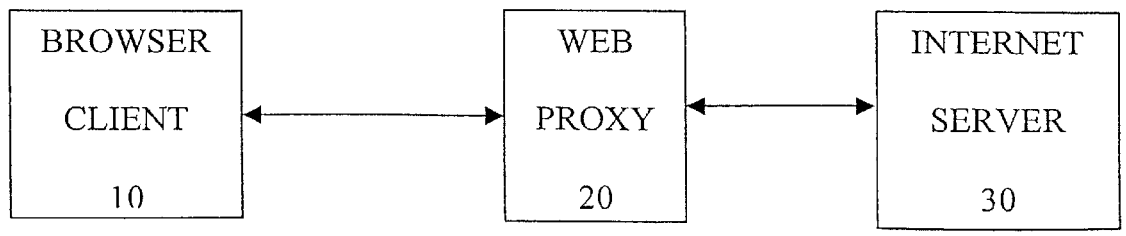
FIGURE 2

Please enter a User ID for use in personalizing your web experience: ☐

FIGURE 4

SYSTEM AND METHOD FOR MAINTAINING STATE INFORMATION BETWEEN A WEB PROXY SERVER AND ITS CLIENTS

CROSS-REFERENCE TO RELATED APPLICATION

This application is related to U.S. patent application Ser. No. 09/333,810 to Makarios et al., incorporated herein by reference.

BACKGROUND OF THE INVENTION

1. Field of the Invention

The present invention is directed to distributed data communication systems and, more particularly, to intelligent proxies for conducting and enhancing communications between network users and network server hosts in a fashion which is customized for particular users or groups of users applying the technology. Most particularly, the invention is directed to techniques for aiding such intelligent proxies in identifying clients or users so that the proxies may appropriately customize network communications for those users.

2. Background of the Related Art

Typically, a distributed computing network such as the Internet is formed of a number of geographically diverse hosts which are connected to one another, and a number of network users, each of which uses one of the hosts and communicates with other computers on the network through that host (an individual with a personal computer is an example of a single-user host). Although the hosts may be directly connected to the Internet at large so that any information sent to or from a user's host flows along an unimpeded path to its destination, it is normal and beneficial to interpose a firewall between the host or hosts of a user or group of users and the Internet at large. The firewall performs several functions. Most importantly, it controls the flow of information from the Internet at large to the host. By doing so, the firewall can prevent the introduction of viruses, hacker attacks and the like to the user's host. It can also provide similar benefits in regulating traffic in the opposite direction, i.e., from the user's host to the Internet.

A firewall is a complex of functions implemented using a combination of hardware and software, operating to both protect an organization from outside information-related threats and to protect the organization from release of information. An "application-level proxy" is one component of a firewall which is designed to manage the transmission of information relevant to some application or protocol such as HTTP (Hypertext Transfer Protocol, used on the World Wide Web). The basic function of a web proxy is to forward user requests for web documents to their ultimate destinations at various servers on the web and to relay responses back to users. This enables central administration of a single point of transmission through an organization's firewall.

The decentralized nature of the Internet means that the sources of all information relevant to web users are disparate. As shown in FIG. 1, available information may include vendor-supplied commercial information 50, news 60, opinions 70, ratings 80 and the like. Most web users 90 probably would like to include more sources of information in their activities than they currently do, and would make use of these disparate sources if they were conveniently able to do so. The disparate nature of the needed information, inconvenience of using it, time and cost typically prevent this from happening. Thus, there is a need for the ability to observe, augment, reduce, or otherwise alter general web content for the benefit of a user or group.

Current tools available to users 90 for improving the web experience are inadequate in this respect. Search engines 20 attempt to locate germane documents by examining a large amount of mostly irrelevant information. This is because they are ignorant of user characteristics and hence imprecise. Portals 30 are precise collections of content; however, the available information is determined by the owner of the portal 30, positioning fees paid to the owner and the like. Thus, a user's choices in a portal 30 are controlled and restricted and may not be relevant. Finally, a branded community 40 is vendor-centric, designed to function only over vendor-enabled sites, and is designed to maximize customer "switching costs", thus possibly working against the user's best interests.

The aforementioned Makarios et al. application solves this problem by providing an intelligently augmentable web proxy server which understands the purposeful activities of users and groups which it serves and also enhances their web experience by altering information they receive and send in ways that make it more useful based on its understanding of them. The system includes the web proxy layer, an agent support layer on top of the web proxy layer, and an agent application layer on top of the agent support layer. The agent support layer interfaces with the web proxy layer and includes request agencies which manage a group of personal agents dedicated to analyzing and transforming the web stream of a particular user, and a common agent environment through which agents in the agent application layer can exchange information. In addition to the personal agents managed by the request agency, the agent application layer also includes universal agents which operate autonomously of the activities of users to peruse and understand sources of information on the web based on information gathered by the personal agents.

Although the above provides a workable system, it still requires some method of identifying its clients or users, since the system cannot perform proper customization procedures for them if their identities are not known to the proxy. That is, the system must retain information about a user in order to modify the user's web interactions on an individual and customized basis.

In a small-scale system it may be possible to assign each client to a dedicated port on the proxy, so that the proxy knows all requests coming from a particular port belong to a given client. However, this technique is too limiting to be of practical use in typical Internet systems where any number of users may selectively connect to any port on the proxy at a given time. Further, it is inadequate in systems where the number of users who can access the proxy outnumbers the number of proxy ports.

SUMMARY OF THE INVENTION

The present invention has been made with the above problems of the prior art in mind, and it is an object of the present invention to provide a means by which a web proxy server can establish and maintain state information with a particular web client to, for example, maintain the identity of a user who is making a sequence of web requests to arbitrary servers located anywhere on the web via the proxy.

This object is achieved according to an aspect of the present invention by providing a system and method which implements a series of token exchange transactions similar to those used when passing browser "cookies" between an Internet server and a browser client. Rather than instigating a cookie exchange transaction from the Internet server to store information relevant to the server, according to this aspect of the present invention the proxy cookie is stored on the client side at the behest of the web proxy. To the browser client, the proxy cookie appears to be identical to any regular browser cookie; however, whenever the browser client presents a request for information to the proxy which is to be passed on to the Internet server, the proxy strips the proxy cookie from the request and uses it to identify the originator of the request. Based on this, the proxy can customize and personalize the client's information request as appropriate and pass it on to the Internet server.

BRIEF DESCRIPTION OF THE DRAWINGS

These and other objects, features, and advantages of the present invention are better understood by reading the following detailed description of the preferred embodiment, taken in conjunction with the accompanying drawings, in which:

FIG. 1 is a diagram of the operation of web hosts and users on the Internet according to the prior art;

FIG. 2 is a block diagram of a client-proxy-server network;

FIG. 4 is a signup page for providing initial identifying information according to the preferred embodiment.

DETAILED DESCRIPTION OF THE PRESENTLY PREFERRED EXEMPLARY EMBODIMENT

Figure 3:
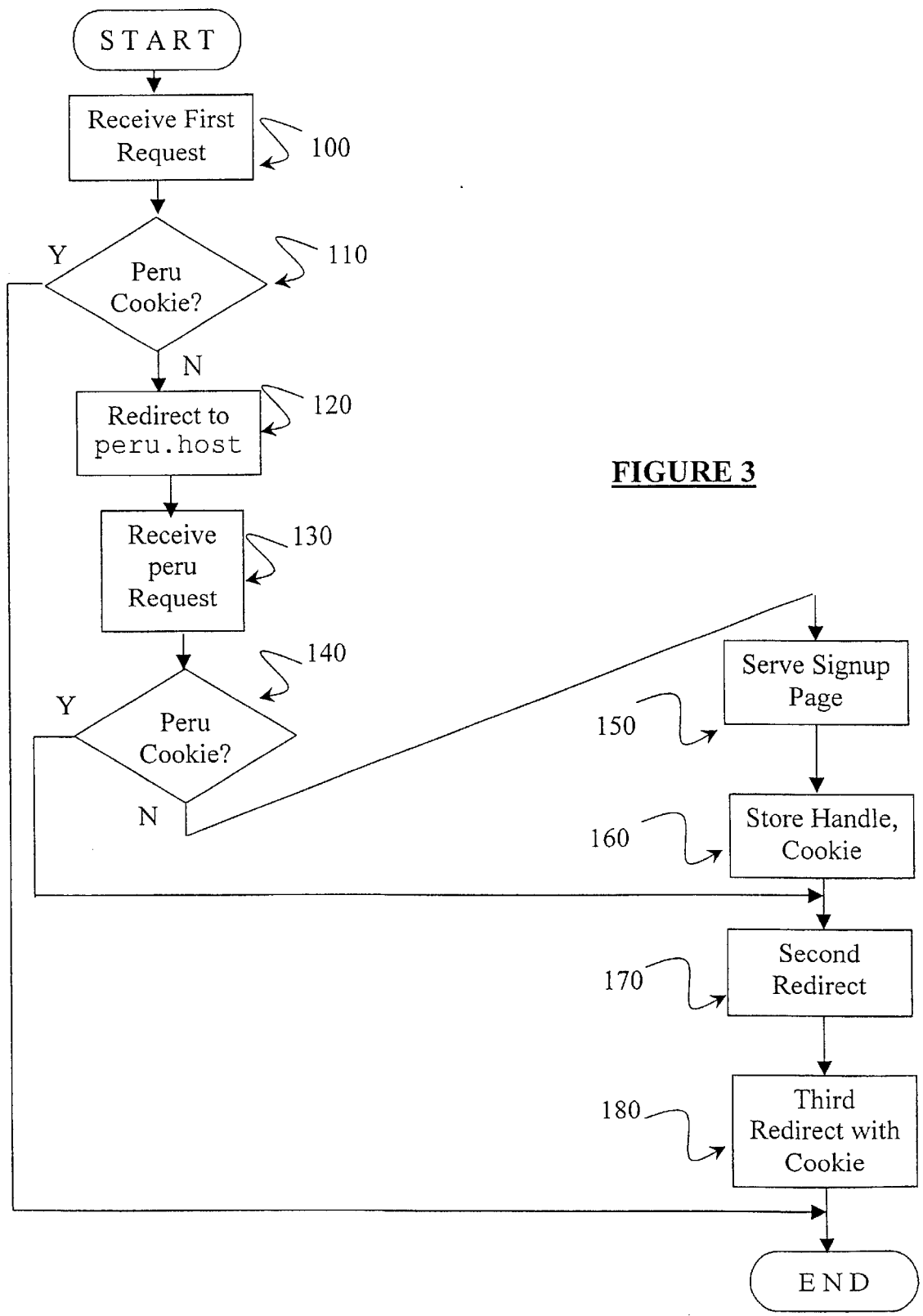
FIG. 3 is a flowchart of proxy cookie exchanges according to a preferred embodiment of the present invention.

When returning an HTTP object 40 to a client 10 shown in FIG. 2 via a web proxy 20, an Internet server 30 may include in the object 40 a piece of persistent state information 50 for the client 10 to store. This state information is called a browser cookie. For example, a server-side CGI script would use the code Set-Cookie: NAME=VALUE; expires=DATE; path=PATH; domain=DOMAIN_NAME; secure to add an HTTP header causing the browser client 10 to store a new cookie 50, where VALUE is an alphanumeric string denoting the name of the cookie 50;

DATE is the end of the valid life time of the cookie 50 (the date after which it may be overwritten or not given out);

PATH specifies the subset of Universal Resource Locators (URLs) in a domain for which the cookie 50 is valid, with/being the most general path;

DOMAIN_NAME specifies a pattern to be matched when the browser is searching through the list of its cookies for valid cookies 50 to return with an information request. Only domains whose tails match the DOMAIN_NAME field (and additionally match the PATH field) will receive the cookie 50 associated with that field; and secure is an optional flag which indicates that the cookie 50 will only be transmitted to an Internet server if the established communications channel is a secure one, e.g., an HTTPS connection.

Cookie creation in JavaScript might look something like

<SCRIPT LANGUAGE="JavaScript">
document.cookie="foo=bar; path=/; expires=Thu, 24-Jun-1999 00:00:00 GMT"; </SCRIPT> and in PERL,

Content-type: text/html
Set-Cookie: foo=bar; path=/; expires=Thu, 24-Jun-1999 00:00:00 GMT
Location: http://www.myserver.com Storage of the cookie 50 on the browser client 10 is typically done without the express consent of the user; however, the most popular browsers in use provide the ability to prevent the browser program from storing or serving any cookies at all.

Later when the browser client 10 requests some information from a web server 30, the browser 10 will search through a list of cookies 50 it maintains internally and, finding one having appropriate domain and path fields, will include it in the request, e.g., Cookie: CUSTOMER_NAME=John_Doe The web server 30 may then use that information to personalize the response served to the user, set the user's account options, or the like.

Although the browser client 10 will on occasion provide personalizing information about itself in this way, such operation is possible only if the browser client 10 has previously accessed that particular web server 30 and stored a cookie 50 it received from the server 30. In other cases, such as when the web server 30 did not ask the browser client 10 to store a cookie 50, or the browser client 10 has never before accessed that web server 30, such personalizing information cannot be provided and the information returned to the web client 10 cannot be customized.

A preferred embodiment of the present invention solves this problem. As shown in FIG. 3, in Step 100 the system (preferably a computer program running on the proxy 20 or something similar) monitors requests generated by the browser client 10 for HTTP objects. When the browser client 10 generates such a request, it is intercepted and in Step 110 the system checks it to see if it contains a proxy cookie 50', i.e., a cookie conforming to a special format such as perucookie=<userID>

If so, program flow jumps to Step 180 in which the proxy cookie 50' is stripped from the information request generated by the browser client 10 and used as an index or key for personalizing and customizing the client's information request. For example, as will be apparent to those of ordinary skill in the art after studying the above-mentioned copending application to Makarios et al., the user ID specified in perucookie may be used to index into a table of attributes used in customization and personalization operations for that particular user.

If, on the other hand, Step 110 determines that no proxy cookie 50' was included with the information request from the browser client 10, in Step 120 the proxy 20 will cause the browser client 10 to redirect to a new web page in a manner known in the art. Assume, for example, in Step 100 the browser client initially requests an HTTP object such as a web page as follows:

GET http://www.bungalow.com

Seeing no proxy cookie 50' in Step 110, in Step 120 the proxy 20 would redirect the browser client 10, causing it in Step 130 to generate the subsequent information request GET http://peru.host/?peru-command=peru-fetch-peru-cookie&peru-url=
http%3A%2F%2Fwww.bungalow.com%2F where peru. host is a syntactically valid (albeit fictitious) URL and peru-command=perufetch-peru-cookie and peru-url=http%3A%2F%2Fwww.bungalow.com%2F are fields which the proxy 20 has directed the browser client 10 to include in the request.

Having received the product of the redirection from the browser client 10 in Step 130, in Step 140 the system examines the redirected request to see if the browser client 10 has also included a cookie for peru.host, i.e., perucookie= <userID>. If so, it means that the user has previously accessed this particular proxy 20 from his or her current browser client 10. If not, it means that the user has never before accessed this particular proxy from his or her current browser client 10.

If Step 140 determines that the latter is the case, i.e., this is the first time for the user to access the proxy 20 from this browser client 10, in Step 150 the system serves the browser client 10 a signup web page or form as prompting him or her to provide a handle or nickname for identification in subsequent transactions, as shown in FIG. 4. Simultaneously, in Step 150 the system directs the browser client 10 to store a proxy cookie 50' which appears to come from the peru. host domain.

When the user types in a name and submits the form, the name is returned to the proxy 20 (along with the proxy cookie 50', since it now matches the peru.host domain). Then, in Step 160, proxy 20 stores the name for this user, associated with the proxy cookie 50', for use in future customization operations.

Once the browser client 10 sends a proxy cookie 50' to the proxy 20, whether it be the first exchange after receiving the proxy cookie in Step 150 or a subsequent exchange of a previously-stored cookie in Step 130, in Step 160 the proxy 20 once again redirects the browser client 10 to make an information request of its original target, e.g., GET http://www.bungalow.com/?peru-command=peru-found-peru-cookie&peru-cookie-value=95960

Upon receiving this request, in Step 170 the proxy 20 recognizes the command peru-found-peru-cookie and the proxy cookie 50' with associated value. In response to this, the proxy 20 passes the proxy cookie 50' to the browser client 10 in a second redirect and, since the proxy cookie appears to the browser client 10 to have come from www. bungalow. com, the browser client associates it with that location in its cookie list. Then, responding to the redirection command from the proxy 20, in Step 180 the browser client 10 issues another information request—to the original URL sought:

GET http://www.bungalow.com which will also include the cookie perucookie=95960 which the browser had just associated with the original URL. Thus, the end result is that the browser client 10 issues its original information request along with a proxy cookie 50' uniquely identifying it to the proxy 20. The proxy cookie 50' will then be stripped by the proxy 20 and used to customize the web experience of the user of the browser client 10.

The above operations cover situations where the browser client 10 makes its first-ever request to some particular server on the Internet, since it addresses the absence of proxy cookies for a given site. When, on the other hand, the proxy 20 sends responses to the browser client 10, it can easily append a proxy cookie 50' thereto which the browser client 10 will take to come from the Internet server and include with future requests to that server. Since the incoming response identifies the browser client 10 to which the response is to be supplied, the proxy 20 can select a previously-created proxy cookie 50' for this purpose, or it can create a new browser cookie 50' and associate it with that browser client 10.

The present invention has been described above in connection with a preferred embodiment thereof; however, this has been done for purposes of illustration only, and the invention is not so limited. Indeed, variations of the invention will be readily apparent to those skilled in the art and also fall within the scope of the invention.

What is claimed is:

1. A method comprising:
   receiving a first information request directed to a first recipient and determining whether the first request includes a first given type of state information;
   when the first request lacks the first given type of state information,
      redirecting an issuer of the first request to issue a second information request to a second recipient,
      receiving a second information request directed to the second recipient and determining whether the second request includes a second given type of state information, and
   when the second request lacks the second given type of state information,
      causing the issuer to provide information uniquely identifying the issuer;
      receiving the unique information and redirecting the issuer to the first recipient;
      receiving a third information request directed to the first recipient and including the information uniquely identifying the issuer; and
      causing the issuer to store the information uniquely identifying the issuer and associate it with the first recipient and redirecting the issuer to issue a fourth information request to the first recipient along with the information uniquely identifying the issuer.

2. The method of claim 1, wherein the first given type of state information is state information identifying the issuer.

3. The method of claim 1, wherein the first given type of state information is a cookie.

4. The method of claim 1, wherein the second given type of state information is state information identifying the issuer.

5. The method of claim 1, wherein the second given type of state information is a cookie.

6. The method of claim 1, wherein the second recipient is non-existent.

7. The method of claim 1, wherein causing the issuer to provide information uniquely identifying the user comprises obtaining a unique identifier chosen by the issuer.

8. A system comprising:
   means for receiving a first information request directed to a first recipient and determining whether the first request includes a first given type of state information;
   means for, when the first request lacks the first given type of state information, redirecting an issuer of the first request to issue a second information request to a second recipient,
   means for, after the issuer has been redirected to issue the second information request, receiving a second information request directed to the second recipient and determining whether the second request includes a second given type of state information, and
   means for, when the second request lacks the second given type of state information, causing the issuer to provide information uniquely identifying the issuer;
   means for receiving the unique information and redirecting the issuer to the first recipient;
   means for, after the issuer has been redirected to the first recipient, receiving a third information request directed to the first recipient and including the information uniquely identifying the issuer; and means for, after receipt of the third information request, causing the issuer to store the information uniquely identifying the issuer and associate it with the first recipient and redirecting the issuer to issue a fourth information request to the first recipient along with the information uniquely identifying the issuer.

* * * * *